US012773959B2

(12) United States Patent
Stoltz

(10) Patent No.: US 12,773,959 B2
(45) Date of Patent: Oct. 27, 2026

(54) SYSTEM, METHOD, AND APPARATUS FOR POWER MODULATION FOR AN AFTERTREATMENT HEATER

(71) Applicant: Eaton Intelligent Power Limited, Dublin (IE)

(72) Inventor: Thomas Joseph Stoltz, Allen Park, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 132 days.

(21) Appl. No.: 18/592,959

(22) Filed: Mar. 1, 2024

(65) Prior Publication Data

US 2024/0198936 A1 Jun. 20, 2024

Related U.S. Application Data

(63) Continuation of application No. PCT/EP2022/025413, filed on Sep. 2, 2022.

(60) Provisional application No. 63/241,872, filed on Sep. 8, 2021.

(51) Int. Cl.
*B60R 16/033* (2006.01)
*H02J 1/10* (2006.01)
*H02J 7/14* (2006.01)

(52) U.S. Cl.
CPC .............. *B60R 16/033* (2013.01); *H02J 1/10* (2013.01); *H02J 7/1446* (2013.01)

(58) Field of Classification Search
CPC ......... B60R 16/033; H02J 1/10; H02J 7/1446; H02J 1/082; B60L 2270/12; B60L 7/16; B60L 50/16; B60L 50/61
See application file for complete search history.

(56) References Cited

U.S. PATENT DOCUMENTS

2014/0102187 A1 4/2014 Andreae
2017/0253127 A1 9/2017 Ciaccio et al.

OTHER PUBLICATIONS

International Search Report and Written Opinion issued in International Application No. PCT/EP2022/025413, mailed Jan. 30, 2023, 11 pages.

*Primary Examiner* — Daniel Cavallari
(74) *Attorney, Agent, or Firm* — Talem IP Law, LLP

(57) ABSTRACT

Systems may include an electrical load for a vehicle; a power provider for the electrical load, comprising a plurality of components including a battery pack, a vehicle electrical system, and a DC/DC converter electrically interposed between the electrical load and others of the plurality of components of the power provider. The systems may further include a power management controller, including a load power management circuit structured to: interpret a load power request; and provide at least one of a power modulation command or a voltage modulation command in response to the load power request, wherein the DC/DC converter is responsive to the at least one of the power modulation command or the voltage modulation command to provide at least one of a boost voltage or a buck voltage to a voltage provided by at least one of the battery pack or the vehicle electrical system.

19 Claims, 7 Drawing Sheets

SYSTEM, METHOD, AND APPARATUS FOR POWER MODULATION FOR AN AFTERTREATMENT HEATER

SUMMARY

In some aspects, the techniques described herein relate to a system, including: an electrical load for a vehicle; a power provider for the electrical load, including a plurality of components including: a battery pack; a vehicle electrical system; and a DC/DC converter electrically interposed between the electrical load and others of the plurality of components of the power provider; and a power management controller, including: a load power management circuit structured to: interpret a load power request; and provide at least one of a power modulation command or a voltage modulation command in response to the load power request, wherein the DC/DC converter is responsive to the at least one of the power modulation command or the voltage modulation command to provide at least one of a boost voltage or a buck voltage to a voltage provided by at least one of the battery pack or the vehicle electrical system.

In some aspects, the techniques described herein relate to a system, wherein the vehicle electrical system includes an alternator of the vehicle.

In some aspects, the techniques described herein relate to a system, wherein: the power management controller further includes a power tracking circuit structured to perform a power point tracking operation; and the load power management circuit is further structured to provide the at least one of the power modulation command or the voltage modulation command in response to the power point tracking operation.

In some aspects, the techniques described herein relate to a system, wherein the power point tracking operation includes a maximum power point tracking operation.

In some aspects, the techniques described herein relate to a system, wherein: the power management controller further includes a temperature determination circuit structured to interpret at least one temperature value 214 of at least one component of the power provider; and the load power management circuit is further structured to provide the at least one of the power modulation command or the voltage modulation command in response to the at least one temperature value 214.

In some aspects, the techniques described herein relate to a system, wherein the temperature determination circuit is further structured to interpret the at least one temperature value 214 in response to a temperature model of the at least one component.

In some aspects, the techniques described herein relate to a system, wherein the at least one component includes at least one of: a conduit coupled to the electrical load, a connector, a battery terminal, a battery, a battery pack, or an alternator.

In some aspects, the techniques described herein relate to a system, wherein: the power management controller further includes a power tracking circuit structured to perform a power point tracking operation in response to the at least one temperature value 214; and the load power management circuit is further structured to provide the at least one of the power modulation command or the voltage modulation command in response to the at least one temperature value 214.

In some aspects, the techniques described herein relate to a system, wherein the power point tracking operation includes a maximum power point tracking operation.

In some aspects, the techniques described herein relate to a system, wherein the load power management circuit is further structured to provide the voltage modulation command in response to a voltage drop across one of the plurality of components of the power provider.

In some aspects, the techniques described herein relate to a system, wherein the one of the plurality of components of the power provider includes a wire electrically coupling the DC/DC converter to the electrical load.

In some aspects, the techniques described herein relate to a system, wherein the DC/DC converter includes a buck/boost converter.

In some aspects, the techniques described herein relate to a system, wherein the load power request includes at least one of: a power request to service activity of the electrical load; when power is transferred from a driveline of the vehicle to at least one of the battery pack or the vehicle electrical system, a power transfer request; or a power requirement.

In some aspects, the techniques described herein relate to a system, wherein the power transfer request includes requesting an amount of power to be recovered, during a power regeneration operation, from the driveline to at least one of the battery pack or the vehicle electrical system.

In some aspects, the techniques described herein relate to a system, wherein the power requirement is 5 kW of load.

In some aspects, the techniques described herein relate to a system, wherein the load power request includes at least one of: a state value indicating that power transfer is requested or quantifying the power transfer requested; a power value, including a power direction indication; at least one of an electrical characteristic request and a limit for an electrical characteristic; a transient description for at least one of: the state value, the power value, the electrical characteristic request, or the limit for an electrical characteristic; or hysteresis for at least one of: the state value, the power value, the electrical characteristic request, or the limit for an electrical characteristic.

In some aspects, the techniques described herein relate to a system, wherein the state value indicates at least one of: heating, heating at a specific mode, initial heating, maintenance heating, aftertreatment regeneration heating, a regenerative braking mode, or a coasting mode.

In some aspects, the techniques described herein relate to a system, wherein the power direction indication includes at least one of: 3 kW to a heater of the vehicle, ±5 kW from a driveline of the vehicle, 2.5 kW to the electrical load, and heating at a maximum power available.

In some aspects, the techniques described herein relate to a system, wherein the electrical characteristic request includes at least one of: 150 A and 50V DC.

In some aspects, the techniques described herein relate to a system, wherein the limit for the electrical characteristic includes at least one of: 2.5 kW to a heater of the vehicle or ≥ 48V DC.

In some aspects, the techniques described herein relate to a system, wherein the transient description includes at least one of: a ramp-up rate, a ramp-down rate, or selected filtering on a load power request.

In some aspects, the techniques described herein relate to a system, wherein the hysteresis includes at least one of: limiting toggling behavior, limiting switching behavior, toggling between power ratings, turning an actuator on or off; or changing power direction.

In some aspects, the techniques described herein relate to a system, wherein the load power request is provided as at least one of: a quantified value, a qualitative value, a selected operating mode, respective commands for aspects of a power transfer, a voltage value, a current value, selected switch states, respective commands to control different loads or heaters individually, or respective commands to control portions of a heater of the vehicle.

In some aspects, the techniques described herein relate to a system, wherein the load power request is provided by at last one of an external controller, a vehicle controller, an engine controller, an aftertreatment controller, or a controller associated with the electrical load.

In some aspects, the techniques described herein relate to a system, wherein the load power request is determined from at least one of: a system state; a start event of a prime mover of the vehicle; ambient conditions of the vehicle; an operating mode of the prime mover of the vehicle; or an operating mode of an aftertreatment system of the vehicle.

In some aspects, the techniques described herein relate to a system, including: a means for providing an electrical load for a vehicle; a means for providing power for the electrical load, including a plurality of components including: a battery pack; a vehicle electrical system; and a DC/DC converter electrically interposed between the electrical load and others of the plurality of components of the means for providing power; and a means for controlling power management, including: a means for load power management structured to: interpret a load power request; and provide at least one of a power modulation command or a voltage modulation command in response to the load power request, wherein the DC/DC converter is responsive to the at least one of the power modulation command or the voltage modulation command to provide at least one of a boost voltage or a buck voltage to a voltage provided by at least one of the battery pack or the vehicle electrical system.

In some aspects, the techniques described herein relate to a system, wherein the vehicle electrical system includes an alternator of the vehicle.

In some aspects, the techniques described herein relate to a system, wherein: the means for controlling power management further includes a means for power tracking structured to perform a power point tracking operation; and the means for load power management is further structured to provide the at least one of the power modulation command or the voltage modulation command in response to the power point tracking operation.

In some aspects, the techniques described herein relate to a system, wherein the power point tracking operation includes a maximum power point tracking operation.

In some aspects, the techniques described herein relate to a system, wherein: the means for controlling power management further includes a means for temperature determination structured to interpret at least one temperature value 214 of at least one component of the means for providing power; and the means for load power management is further structured to provide the at least one of the power modulation command or the voltage modulation command in response to the at least one temperature value 214.

In some aspects, the techniques described herein relate to a system, wherein the means for temperature determination is further structured to interpret the at least one temperature value 214 in response to a temperature model of the at least one component.

In some aspects, the techniques described herein relate to a system, wherein the at least one component includes at least one of: a conduit coupled to the electrical load, a connector, a battery terminal, a battery, a battery pack, or an alternator.

In some aspects, the techniques described herein relate to a system, wherein: the means for controlling power management further includes a means for power tracking structured to perform a power point tracking operation in response to the at least one temperature value 214; and the means for load power management is further structured to provide the at least one of the power modulation command or the voltage modulation command in response to the at least one temperature value 214.

In some aspects, the techniques described herein relate to a system, wherein the power point tracking operation includes a maximum power point tracking operation.

In some aspects, the techniques described herein relate to a system, wherein the means for load power management is further structured to provide the voltage modulation command in response to a voltage drop across one of the plurality of components of the means for providing power.

In some aspects, the techniques described herein relate to a method, including: providing an electrical load for a vehicle; providing power, for the electrical load, via a power provider including a plurality of components including: a battery pack; a vehicle electrical system; and a DC/DC converter electrically interposed between the electrical load and others of the plurality of components of the power provider; and controlling power management, including managing load power, including: interpreting a load power request; and providing at least one of a power modulation command or a voltage modulation command in response to the load power request, wherein the DC/DC converter is responsive to the at least one of the power modulation command or the voltage modulation command to provide at least one of a boost voltage or a buck voltage to a voltage provided by at least one of the battery pack or the vehicle electrical system.

In some aspects, the techniques described herein relate to a method, wherein the vehicle electrical system includes an alternator of the vehicle.

In some aspects, the techniques described herein relate to a method, wherein: the controlling the power management further includes performing a power point tracking operation; and the managing load power further includes providing the at least one of the power modulation command or the voltage modulation command in response to the power point tracking operation.

In some aspects, the techniques described herein relate to a method, wherein the power point tracking operation includes a maximum power point tracking operation.

In some aspects, the techniques described herein relate to a method, wherein: the controlling the power management further includes determining temperature, including interpreting at least one temperature value 214 of at least one component among the plurality of components providing power; and the managing the load power further includes providing the at least one of the power modulation command or the voltage modulation command in response to the at least one temperature value 214.

In some aspects, the techniques described herein relate to a method, wherein the determining temperature further includes interpreting the at least one temperature value 214 in response to a temperature model of the at least one component.

In some aspects, the techniques described herein relate to a method, wherein the at least one component includes at least one of: a conduit coupled to the electrical load, a connector, a battery terminal, a battery, a battery pack, or an alternator.

In some aspects, the techniques described herein relate to a method, wherein: the controlling power management further includes performing a power point tracking operation in response to the at least one temperature value 214; and the managing load power further includes providing the at least one of the power modulation command or the voltage modulation command in response to the at least one temperature value 214.

In some aspects, the techniques described herein relate to a method, wherein the power point tracking operation includes a maximum power point tracking operation.

In some aspects, the techniques described herein relate to a method, wherein the managing load power further includes providing the voltage modulation command in response to a voltage drop across one of the plurality of components of the power provider.

In some aspects, the techniques described herein relate to a method, wherein the one of the plurality of components of the power provider includes a wire electrically coupling the DC/DC converter to the electrical load.

In some aspects, the techniques described herein relate to a method, wherein the DC/DC converter performs at least one of: raising the voltage provided by at least one of the battery pack or the vehicle electrical system; and lowering the voltage provided by at least one of the battery pack or the vehicle electrical system.

In some aspects, the techniques described herein relate to a method, wherein the load power request includes at least one of: a power request to service activity of the electrical load; when power is transferred from a driveline of the vehicle to at least one of the battery pack or the vehicle electrical system, a power transfer request; or a power requirement.

In some aspects, the techniques described herein relate to a method, wherein the power transfer request includes requesting an amount of power to be recovered, during a power regeneration operation, from the driveline to at least one of the battery pack or the vehicle electrical system.

In some aspects, the techniques described herein relate to a method, wherein the power requirement is 5 kW of load.

In some aspects, the techniques described herein relate to a method, wherein the load power request includes at least one of: a state value indicating that power transfer is requested or quantifying the power transfer requested; a power value, including a power direction indication; at least one of an electrical characteristic request and a limit for an electrical characteristic; a transient description for at least one of: the state value, the power value, the electrical characteristic request, or the limit for an electrical characteristic; or hysteresis for at least one of: the state value, the power value, the electrical characteristic request, or the limit for an electrical characteristic.

In some aspects, the techniques described herein relate to a method, wherein the state value indicates at least one of: heating, heating at a specific mode, initial heating, maintenance heating, aftertreatment regeneration heating, a regenerative braking mode, or a coasting mode.

In some aspects, the techniques described herein relate to a method, wherein the power direction indication includes at least one of: 3 kW to a heater of the vehicle, ±5 kW from a driveline of the vehicle, 2.5 kW to the electrical load, and heating at a maximum power available.

In some aspects, the techniques described herein relate to a method, wherein the electrical characteristic request includes at least one of: 150 A and 50V DC.

In some aspects, the techniques described herein relate to a method, wherein the limit for the electrical characteristic includes at least one of: 2.5 kW to a heater of the vehicle or ≥ 48V DC.

In some aspects, the techniques described herein relate to a method, wherein the transient description includes at least one of: a ramp-up rate, a ramp-down rate, or selected filtering on a load power request.

In some aspects, the techniques described herein relate to a method, wherein the hysteresis includes at least one of: limiting toggling behavior, limiting switching behavior, toggling between power ratings, turning an actuator on or off; or changing power direction.

In some aspects, the techniques described herein relate to a method, wherein the load power request is provided as at least one of: a quantified value, a qualitative value, a selected operating mode, respective commands for aspects of a power transfer, a voltage value, a current value, selected switch states, respective commands to control different loads or heaters individually, or respective commands to control portions of a heater of the vehicle.

In some aspects, the techniques described herein relate to a method, wherein the load power request is provided by at last one of an external controller, a vehicle controller, an engine controller, an aftertreatment controller, or a controller associated with the electrical load.

In some aspects, the techniques described herein relate to a method, wherein the load power request is determined from at least one of: a system state; a start event of a prime mover of the vehicle; ambient conditions of the vehicle; an operating mode of the prime mover of the vehicle; or an operating mode of an aftertreatment system of the vehicle.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1:
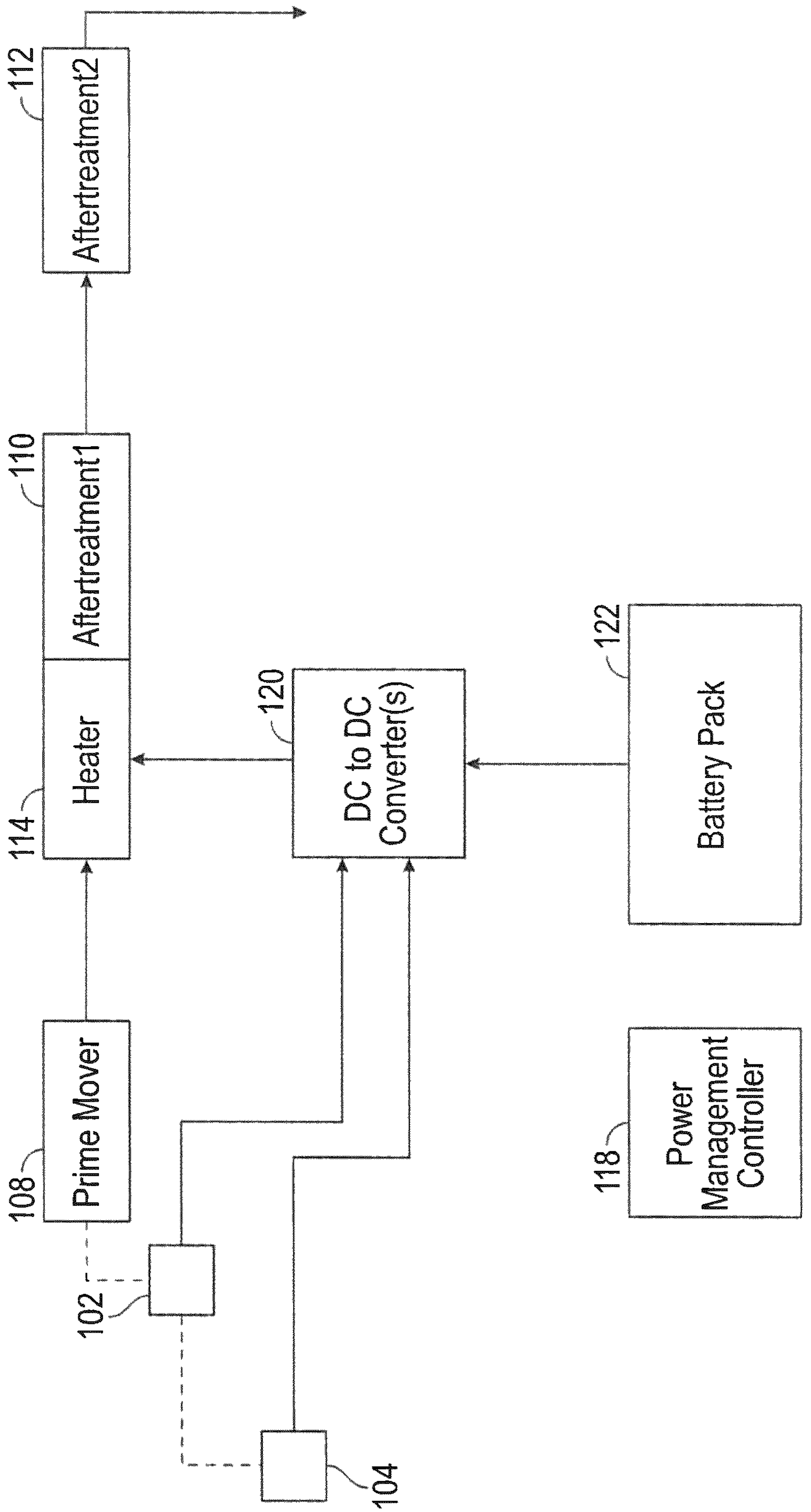
FIG. 1 depicts an example system including a prime mover and an aftertreatment system.

An example application for the present disclosure includes control of electrical power provision for a heater of an aftertreatment system for a vehicle. Providing power for a heater of an aftertreatment system presents a number of challenges. For example, aftertreatment heating is often required during operating conditions where a prime mover (e.g., an internal combustion engine) is operating in a low load condition, for example after start-up and/or during extended idling periods. In these conditions, the prime mover is typically providing a low temperature and/or low flow exhaust, increasing the heating request from the aftertreatment heating component. Additionally, the aftertreatment system may be at a low temperature, where the heat demand is provided to warm up the aftertreatment system beyond just maintaining temperature. Additionally, an increased disturbance to the driveline, such as a large load request from the alternator or another device mechanically coupled to the prime mover, may be unavailable or undesirable at these operating conditions, due to belt power transfer constraints, limits for acceptable operation and/or driver perception, or the like. Further, available devices to power a heater load request (e.g., the alternator and/or an electrical access to the main vehicle electrical system) may not nominally have the capacity to fully power the heater, requiring that the available device be overdesigned to meet such a power requirement for a relatively small portion of the duty cycle.

Aspects of the present disclosure include a supplemental power management system, having electrical power storage and/or driveline coupling, allowing the supplemental power management system to selectively provide power to the heater and/or exchange power with the driveline. In certain embodiments set forth herein, the supplemental power management system is configured to reduce overdesign of both nominal power providing devices (e.g., the alternator and/or electrical couplings to the vehicle electrical system) and the supplemental power management system. Accordingly, embodiments herein can reduce the overall system cost of the nominal power providing devices and the supplemental power management system.

The present disclosure is described, for clarity of this description, in the context of cooperative power provision to a heater for an aftertreatment system. However, embodiments herein may additionally or alternatively be utilized to power any devices having a significant load requirement, including devices where intermittent high load operation is a significant consideration in operating the device(s). Example loads include, without limitation, pumps, refrigeration units, mixers, drums, electrical accessories of the vehicle, and/or other heaters (e.g., heaters for vocational operations such as asphalt delivery, heaters for intake air for the prime mover, etc.). Embodiments herein are described as delivery of power to a load for clarity of the present description, but embodiments herein may be directed to load acceptance—for example performing regenerative recovery of vehicle kinetic energy, allowing for increased throughput of energy recovery, improved efficiency of energy recovery, or the like.

It can be seen that embodiments herein provide for systems, apparatuses, assemblies, and/or configurations that allow for a reduced capability of one or more components while providing sufficient power, including power delivery and/or energy storage, to operate a variety of mobile applications having one or more electric loads. Example embodiments, for example as depicted in the example system solutions, include providing for reduced capability of an alternator (e.g., lower current delivery capacity, lower control requirement—e.g., reduced capability to manipulate excitation voltage, and/or a lower temperature tolerance requirement), a battery pack (e.g., reduced number and/or voltage of supporting batteries, increased options for battery types, reduced requirement for diagnostic operations related to batteries, etc.), reduced connector requirements (e.g., lower temperature capability, lower current capability, increased options of acceptable materials, etc.), and/or reduced conduit/wire requirements (e.g., lower gauge, reduced insulation requirements, capability to support increased run lengths, etc.). Without limitation to any other aspect of the present disclosure, these and/or other capabilities herein provide for reduced system costs, reduced operational costs, reduced service costs, reduced integration costs (e.g., relaxing some requirements, material selection, and/or component selection, that otherwise increase time and/or complexity for integration of an aftertreatment heater into a mobile application), and/or reduced development costs (e.g., design time, diagnostic development, etc.).

Referencing FIG. 1, an example system includes a prime mover 108 and an aftertreatment system, for example an aftertreatment system configured to treat the exhaust of the prime mover 108 to manage emissions output of a vehicle. In the example system, a first aftertreatment system (aftertreatment1 110) is provided upstream of a second aftertreatment system (aftertreatment2 112) to illustrate certain aspects of the present disclosure. Each aftertreatment system may be configured to treat distinct exhaust constituents (e.g., unburned hydrocarbons, NOx, CO, soot, etc.) and/or to treat distinct fractions of the exhaust (e.g., treating a portion before exhaust gas recirculation versus a portion to be emitted to the environment, etc.). In certain embodiments, the design of the system may be such that a heater 114 is constructed to heat a given portion of the aftertreatment system, and/or to heat the entire aftertreatment system. In certain embodiments, more than one heater may be present (not shown), and in certain embodiments, a given heater may be expected to heat a downstream aftertreatment component (e.g., aftertreatment2 112) even in the presence of the upstream aftertreatment component (e.g., aftertreatment1 110). Because of the thermal mass of chained aftertreatment components that may be present in certain embodiments, and due to the low warm-up time expectations of many systems (e.g., to reduce the overall emissions from the vehicle), the heating requirements for the aftertreatment heater may be substantial, especially during certain operating periods such as after initial start of the prime mover 108, during transient operations, or the like. Additionally, it may be desirable to keep the maximum voltage in the system below certain thresholds to avoid certification requirements, expensive procedures and/or tools for performing maintenance and/or repairs, or the like. Accordingly, the current requirements to support high performance heating operations can be relatively high (e.g., exceeding 50 A, 200 A, or more). Total power requirements for an aftertreatment heater, in certain embodiments, can exceed 5 kW, 10 kW, 15 kW, or more. Thus, a nominal 12V system powering such a load could exceed a 1000 A current requirement, and a nominal 48V system powering such a load could still exceed 300 A. An example system includes a power requirement for a heater of about 200 A at about 52V nominal. Additionally, the total energy delivered during a heating cycle, e.g., a 240 second max heating event, can be significant—for example 1.2 MMJ to 3.6 MMJ for the range of example power requirements and the example heating cycle time. Embodiments herein are configured to improve and/or maximize power delivery of effective electrical energy to the heater, reducing the maximum capability requirement of the electrical system to deliver power, and providing more power for the load rather than heating losses within the electrical system, battery pack, terminals, and/or conduits. Accordingly, improving the efficiency of power transfer can result in significant savings at design time (e.g., reduced requirements for the alternator, battery pack, connections, and/or wires) and/or at run time (e.g., reducing losses that will ultimately be reflected as fuel economy loss and/or grid power make-up energy).

The example system further includes an alternator 102 coupled to a vehicle battery 104—for example operating at a nominal vehicle voltage such as 12V or 24V. In the example of FIG. 1, the alternator 102 and/or the vehicle electrical system, are capable to selectively provide power to the heater, although embodiments herein contemplate that the vehicle electrical system and/or alternator 102 may be isolated from any supplemental electrical power provider and/or the heater 114. The example system includes a power management controller 118, which may include one or more circuits configured to functionally execute operations of the controller. The example power management controller 118 may be coupled to any sensor or actuator of the system, and/or to provide communications, receive data (e.g., sensor data, commands, requests, operating states, etc.) from a communication bus such as a network of the vehicle.

The example system includes a DC/DC converter 120 ("buck/boost converter"), which may be capable of boost operation (e.g., raising the voltage) and/or buck operation (e.g., lowering the voltage). The example DC/DC converter may be of any type, and is controllable by the power management controller. The example buck/boost converter is depicted schematically as interposed between the heater and selected electrical power providers, such as the alternator 102, the vehicle battery 104, and a supplemental battery pack 122. The example buck/boost converter may be a single component with multiple inputs and/or outputs, and/or may include multiple devices configured to cooperate to perform operations set forth herein. An example buck/boost converter is only boost capable—for example where nominal voltage(s) of the battery pack, alternator, and/or vehicle electrical system are modifiable and/or designed to not exceed a voltage of the load/heater. An example buck/boost converter is only buck capable—for example where nominal voltage(s) of the battery pack, alternator, and/or vehicle electrical system are modifiable and/or designed to not fall below an acceptable voltage for the load/heater.

The example system includes a battery pack 122 configured to selectively provide power to the heater 114 or other load. The example battery pack 122 may be at least selectively coupled to the alternator 102 and/or vehicle electrical system—for example to charge the battery pack 122, and/or to allow transfer between the battery pack 122 and the vehicle system, such as to power electrical accessories. The battery pack 122 may be at any selected voltage and may match the vehicle electrical system voltage or be distinct from the vehicle electrical system voltage. An example battery pack is a 48V nominal battery pack, which may include a group of batteries coupled in series to provide the desired voltage. The description of a nominal voltage herein contemplates that the voltage of a given electrical component, such as the battery pack 122, may vary depending upon the state of charge, health or condition of the battery(ies), and/or operating conditions. For example, a 12V lead-acid battery may vary between about 10.5V to about 14V, leading to an actual voltage output for a 4-battery pack between about 42V and 56V. The example arrangements and voltage levels are provided for illustration and are non-limiting.

The example system may include one or more temperature sensors, voltage sensors, current sensors, or any other sensors configured to provide information described herein. Wherever information is described herein, it is understood that such information may be provided by a sensor in the system (e.g., battery terminal temperature, wire temperature, battery bulk temperature, current between any components, current throughput of a component, etc.), provided as a data value to the controller 118 by another component within the system and/or communicatively coupled to the system (e.g., alternator output values provided by a vehicle or engine controller to the power management controller), determined according to other offset values in the system (e.g., according to a model, virtual sensor, correlating parameter, calculated from other values such as power based on current and voltage, etc.), or provided in any other manner. In certain embodiments, the temperature of a component, such as a connecting wire, battery terminal, and/or heating element of the heater, may be determined according to a model, including a model as described herein.

Figure 2:
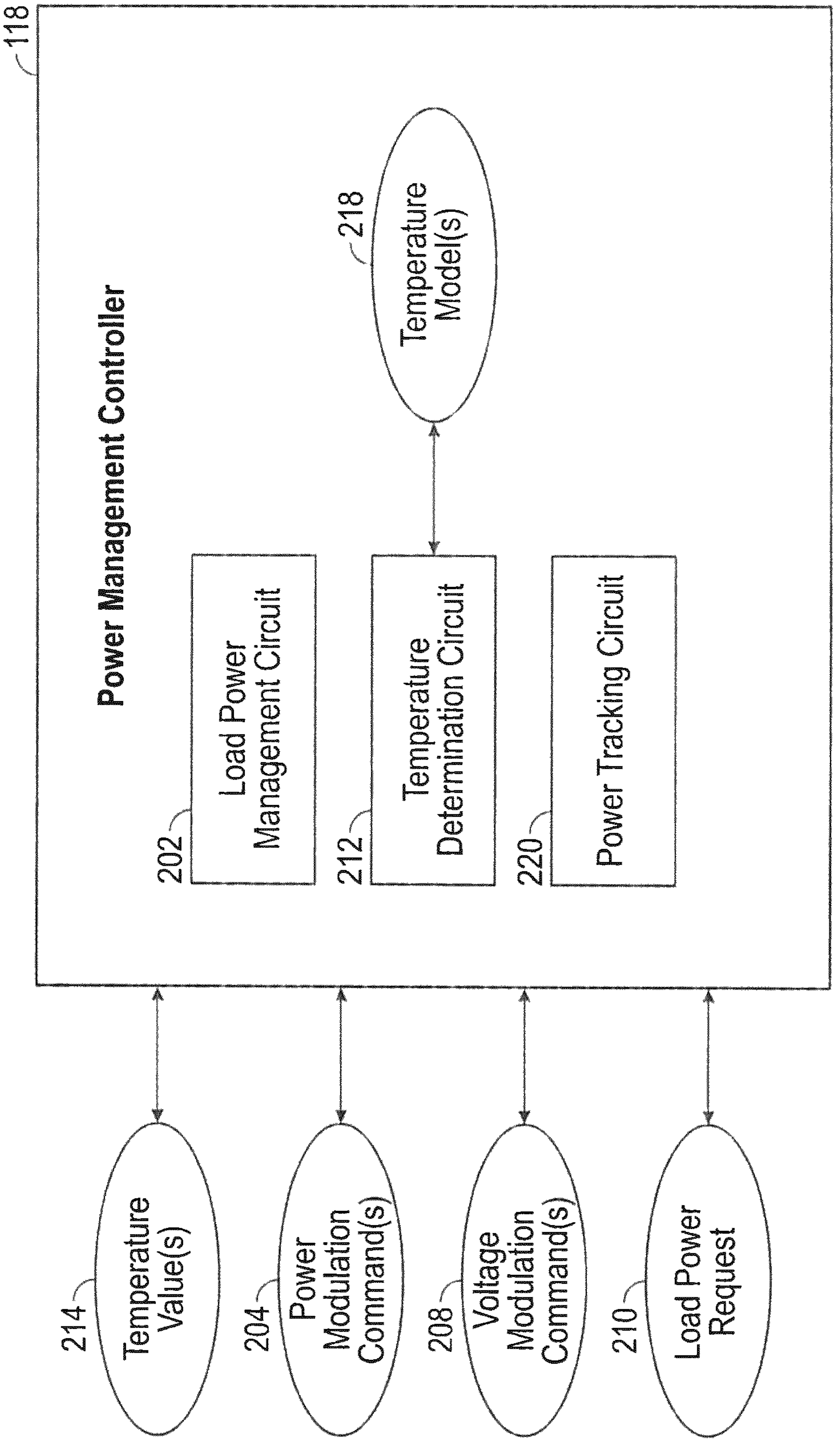
FIG. 2 schematically depicts an example power management controller.

Referencing FIG. 2, an example power management controller 118 is schematically depicted. The power management controller 118 is depicted as a single device for purposes of illustration, but may be a distributed device, and/or positioned in whole or part on another device (e.g., on the boost/buck converter, on a vehicle controller, on an engine controller, etc.). Aspects of the power management controller may be provided as instructions stored on a computer readable medium that, when executed by a processor, execute one or more functions of the power management controller 118. Additionally, or alternatively, one or more aspects of the power management controller 118, and/or circuits thereof, may be embodied in whole or part as a sensor, actuator, hardware device configured to respond to system conditions to perform one or more functions of the power management controller, and/or as a logic circuit configured to perform one or more functions of the power management controller.

An example power management controller 118 includes a load power management circuit 202 configured to provide power modulation commands 204 and/or voltage modulation commands 208 in response to various considerations as set forth herein. In certain embodiments, the power/voltage modulation commands are provided in response to a load power request 210—for example a power request to service activity of a load, such as the heater. In certain embodiments, for example where power is transferred from the driveline to the battery pack and/or vehicle electrical system—for example during regenerative braking and/or coasting operations—the load power request 210 may instead be a power transfer request, such as an amount of power to be recovered during regeneration operations. In certain embodiments, the load power request 210 is a power requirement—for example 5 kW of load, but the load power request 210 may include any value related to power consumption or transfer. Without limitation to any other aspect of the present disclosure, example load power request(s) 210 include: a state value indicating that power transfer is requested and/or quantifying the power transfer requested (e.g., heating; heating at a specific mode such as initial heating, maintenance heating, aftertreatment regeneration heating, regenerative braking mode; coasting mode; etc.); a power value, including a power direction indication (e.g., 3 kW to heater; 5 kW from the driveline (or −5 kW); 2.5 kW to a selected load; heating at a maximum power available; etc.); an electrical characteristic request (e.g., 150 A and 50V DC); limits for these (e.g., 2.5 kW to the heater, at not less than 48V); transient descriptions for these (e.g., including ramp-up and/or ramp-down rates; selected filtering on a load power request 210; which may be applicable to any request and/or response to a request; etc.); and/or hysteresis for any of these (e.g., to limit toggling and/or switching behavior, including toggling between power ratings, turning on/off an actuator; changing power direction; and which may be applied to any request value or response value). In certain embodiments, the load power request 210 is provided as a quantified value, a qualitative value (e.g., a selected operating mode), and/or individual commands for aspects of the power transfer (e.g., a voltage value, current value, selected switch states, for example to control different loads or heaters individually and/or to control portions of the heater separately). In certain embodiments, the load power request 210 may be provided by an external controller, such as a vehicle controller, engine controller, aftertreatment controller, and/or a controller associated with the heater 114 or other load. In certain embodiments, the load power request 210 may be determined from a system state, such as determining the load power request 210 in response to a start event of the prime mover 108, from ambient conditions, from an operating mode of the prime mover 108 and/or aftertreatment system, or the like.

An example power management controller 118 includes a temperature determination circuit 212 that determines one or more temperature value(s) 214 associated with a component of interest in the system. Without limitation to any other aspect of the present disclosure, example and non-limiting temperature values 214 include one or more of: a temperature of the battery pack; a temperature of a battery; a temperature of a battery terminal; a temperature of a connector within the electrical system; a temperature of a bus, conduit, or wire within the electrical system; a temperature associated with the load (e.g., a connector on the load, a motor of the load, a heater, an element of the heater, etc.); a temperature associated with the vehicle (e.g., a prime mover exhaust temperature; an aftertreatment component temperature including inlet, outlet, bulk, and/or substrate temperature; and/or a temperature of exhaust gas at any position in the system. In certain embodiments, a temperature value 214 is determined using a sensor that determines a temperature representative of the temperature value 214, which may be compensated, corrected, filtered, and/or used directly as the temperature value 214. In certain embodiments, a temperature value 214 may be determined by operating a temperature model 218, for example using data available within the system to model a temperature response of a component of interest, and utilizing the modeled temperature as the temperature value 214, and/or determining the temperature value 214 in response to the modeled temperature (e.g., in combination with feedback, as a backup temperature determination, etc.).

An example load power management circuit 202 further adjusts the power and/or voltage modulation commands in response to the temperature value(s) 214. An example operation of the load power management circuit 202 includes an operation to adjust the power and/or voltage commands to limit a temperature of a component to within a predetermined range, and/or below or above a predetermined value. Limiting the temperature of a component includes, without limitation, limiting one or more of: imposing a maximum temperature limit; imposing a maximum temperature slew limit; imposing a minimum temperature limit; imposing a minimum temperature slew limit; imposing a trajectory of any of these (e.g., changing the limits in a schedule manner over time); limiting an area under (or over) a time-temperature curve to a minimum or maximum value; providing a temperature trajectory such that an area under (or over) a time-temperature curve achieves or stays below a set value (e.g., to limit thermal degradation of a component due to time at temperature, to enforce an amount of net heating injected into the exhaust gas, etc.); and/or relative values for these (e.g., using a temperature differential between two components or aspects of the systems, instead of an absolute temperature of one or both). In certain embodiments, operations of the load power management circuit 202 responsive to temperature values 214 may include filtering any input or command; and/or executing hysteresis on any value, trajectory, threshold, or the like. In certain embodiments, operations of the load power management circuit 202 to the temperature values 214 include modifying the power and/or voltage modulation commands to move the temperature value 214 in the desired direction (e.g., reducing I2R heating on a conduit approaching a temperature limit, such as by increasing a voltage to achieve the power request at a lower current value). In certain embodiments, the load power management circuit 202 is responsive to the temperature value 214 to derate the load power request 210—for example changing the load power request 210 and/or using a modified load power request in response to the temperature value 214. In certain embodiments, the load power management circuit 202 is responsive to the temperature value 214 to communicate a request that the load power request 210 should be modified (e.g., providing a request to the vehicle controller, where the vehicle controller determines whether the modified load power request can be accepted). In certain embodiments, the load power management circuit 202 provides an indication, for example to another controller in the system, by setting a fault value, by setting a diagnostic value, and/or by incrementing or decrementing a counter toward any of these, during operating periods where modulation and/or derating are occurring responsive to a temperature value 214.

An example load power management circuit 202 compensates for voltage drop across a wire, for example any wire having high current and/or significant heating as a consequence of operation of the electrical load. An example load management circuit 202 compensates for voltage drop across the main power provision wire(s) for an electric heater, for example accounting for voltage drop from nominal resistance in the wire, from resistance as affected by the temperature (or other effects, such as the applied voltage), and/or accounting for voltage effects from capacitance or other non-idealities of the wire. An example load management circuit 202 compensates for temperature of any component in the system, including compensation for resistance effects, and/or controlling the system to keep the temperature of the component within selected limits. In certain embodiments, voltage control can reduce temperatures or current values in a component (or both—for example where the current and temperature are coupled, for example where a current reduction results in a temperature reduction at the same power throughput), while maintaining similar capability (e.g., power delivery capability). In certain embodiments, voltage control can improve capability even where the system is derated (e.g., delivering best available power within a constraint such as a temperature limit).

In certain embodiments, operations may be combined—for example requesting a modification to the load power request 210 at a first temperature threshold for a component, and enforcing a modification to the load power request 210 at a second temperature threshold for the component (e.g., where the second temperature threshold is higher than the first temperature for a typical system). It can be seen that operations of the load power management circuit 202 to adjust the power/voltage modulation commands 204, 208 and/or load power request 210 allow for adjustment of the system to maintain capability for power transfer while protecting components from thermal degradation and/or failure.

An example system includes the buck/boost converter(s) 120 responsive to the power modulation command 204 and/or voltage modulation command 208 to provide selected power to the heater 114 or load, and/or to accept power from the driveline for provision to the battery pack 122. The buck-boost converter 120, which may be a single circuit or an assembly including more than one circuit, allows for power transfer at selected voltages between the load, the battery pack 122, the alternator 102, and/or the vehicle electrical system. An example system includes the alternator 102 and/or vehicle electrical system operating at a first nominal voltage (e.g., 12V, 24V, 42V, etc.), the battery pack 122 operating at a second nominal voltage (e.g., 12V, 24V, 36V, 48V, etc.), and the load operating at a third nominal voltage (e.g., 24V, 48V, 52V, etc.). In certain embodiments, for example with a resistive heater, the load is flexible to operate at a number of voltages, but may have a preferred voltage (e.g., due to resistor sizing, current capacity of components, etc.). In certain embodiments, one or more components of the system, for example the battery pack 122, may have a variable or selectable voltage (e.g., the power management controller 118 or another controller may have control access to actuators that change a series/parallel configuration of batteries of the battery pack 122). An example buck/boost converter 120 is capable of translating voltages, including variable or selectable voltages, between any values for the input and/or output couplings to the converter.

An example system includes both the vehicle electrical system (e.g., vehicle battery 104, electrical system bus connection, and/or alternator 102) providing power to the load, with the battery pack 122 providing supplemental power to the load under certain operating conditions. For example, the vehicle electrical system may provide power to the load up to a selected value (e.g., power rating, up to 50 A, up to 100 A, etc.), with additional power provided by the battery pack 122 as needed. In certain embodiments, the provision of power between power providers may be provided according to an operating condition of the vehicle (e.g., a first power division for idling, a second power division for operation above a load threshold, and a third power division during aftertreatment regeneration operations). In certain embodiments, power is provided by the source determined to be most efficient, which may depend on the operating condition(s) of the system. For example, power provision may be normally provided by the vehicle electrical system for a given load power request 210, but the battery pack 122 may be at too high of a state of charge (e.g., to preserve margin for regeneration), where the load power management circuit 202 adjusts the power provision to draw the battery pack 122 down to a selected state of charge. In certain embodiments, a combination of these may be utilized—for example using a power provision scheme such as: providing a first increment of power from the vehicle electrical system, and increased power provision according to a most efficient provider; providing a first increment of power from the vehicle electrical system, and providing increased power provision according to a schedule between the power providers; providing power at all times from a most efficient provider; providing power from each provider according to a schedule; and/or providing power from the vehicle electrical system until a threshold value is reached, and providing supplemental increasing power from the battery pack 122. The described examples are illustrative and non-limiting.

An example load power management circuit 202 provides the voltage modulation command 208 to compensate for an off-nominal operating condition. For example, a voltage output of the battery pack 122 may change based on operating conditions such as a state of charge of the battery pack 122 and/or an output current of the battery pack 122, where the load power management circuit 202 provides commands to the buck/boost converter 120 to maintain a same voltage at the heater 114, and/or to maintain a same power at the heater 114 (e.g., increasing voltage above the nominal voltage of the battery pack 122, for example where current delivery capability of the battery pack 122 is insufficient to maintain the load power request 210 and/or modified load power request). In certain embodiments, the load power management circuit 202 is capable to compensate for off-nominal operating conditions of any component, including at least the vehicle electrical system, the alternator 102, and/or the load. In certain embodiments, the off-nominal operating condition may be determined at any point in the system, such as voltage at the heater 114, voltage out of the battery pack 122, voltage at the alternator 102, voltage on a bus of the vehicle electrical system, etc.

An example load power management circuit 202 performs a power point tracking operation to provide the power/voltage modulation commands 204, 208, and/or to modify the load power request. An example power point tracking operation includes modulating voltage provided to the load that provides a selected power characteristic at a selected node, position, or component of the system. For example, the power point tracking operation may enforce a power characteristic at the heater 114 (e.g., a scheduled voltage, current, and/or power dissipation of the heater 114). An example power point tracking operation includes an operation to provide a maximum power to the heater 114, which may be performed utilizing a power dissipation model, using a lookup table based on operating conditions (e.g., temperatures, state of charge, ambient temperatures, exhaust gas temperature, etc.), operating an analytical feature (e.g., using an equation having one or more operating conditions as input), and/or performing feedback operations (e.g., determining voltage and/or current values at the heater, and modulating the power by adjusting voltage values) to perform the power point tracking and/or maximum power point tracking. The utilization of a power point tracking operation promotes the most efficient power transfer for effective use by the load, reducing the overall capability requirements of the alternator 102 and/or battery pack 122, and reducing the overall fuel economy impact of operating the load. In certain embodiments, utilization of a power point tracking operation reduces operational impacts of the load, for example reducing a time until heating is achieved, and/or reducing operational impact of loads on a mission of the vehicle (e.g., total disturbance to the driveline). In certain embodiments, power point tracking may be performed at any position of the system, including at least: at a terminal of one or more batteries of the battery pack 122; at either or both ends of a conduit coupling the battery pack 122 to the buck/boost converter 120; an either or both ends of a conduit coupling the buck/boost converter 120 to the load/heater 114; at a heater electrical inlet; at a heater electrical outlet (e.g., ground coupling); at either or both ends of a conduit coupling the vehicle electrical system to the buck/boost converter 120; and/or at either or both ends of a conduit coupling the alternator 102 to the buck/boost converter 120.

In certain embodiments, for example where a voltage of the alternator 102 and/or vehicle electrical system is adjustable, a power point tracking operation includes adjusting an alternator regulator excitation value. In certain embodiments, for example where a voltage of the battery pack 122 is adjustable (e.g., by reconfiguring a series/parallel arrangement of batteries in the battery pack 122, and/or using a PWM solid state switch interposed between the battery pack 122 and the boost/buck converter 120), a power point tracking operation includes adjusting an exhibited voltage from the battery pack 122.

An example temperature determination circuit 212 operates a temperature model on any component of the system, including at least one or more of a battery terminal, a battery pack, a connector, a conduit (e.g., a wire coupling between any components, including to the heater 114, a load, the battery pack 122, a DC/DC converter 120, the vehicle electrical system, and/or the alternator 102). In certain embodiments, the resistance of a component may vary with the temperature of the component, such that the power delivered to the component varies significantly enough to warrant compensation for temperature effects. In certain embodiments, operations of the load power management circuit 202 utilize a temperature as a reference—for example controlling power flow through the system to keep the temperature within a selected limit, which may vary with time and/or operating conditions. In certain embodiments, operations of the load power management circuit 202 utilize a power value as a reference, for example to provide scheduled power at a selected location, for example to adjust for losses in delivered power to heat generated within component(s) of the system. In certain embodiments, references may be present to more than one temperature and/or power value, for example in a staged control (e.g., a temperature inner loop and a power outer loop) or other multi-reference control operation.

Any temperature model may be utilized herein. Based on simulation and experience, a bulk temperature model of the desired component, for example a battery terminal, connector, and/or conduit (e.g., power feed wire to a heater or load), is sufficient to provide selected power delivery and/or temperature control with arbitrary accuracy. The selected accuracy for a given embodiment depends upon the goals for the control operations based on temperature, for example the reason for the target temperature determination (e.g., component protection, component lifetime wear reduction, power delivery goal—such as maximum power delivered and/or targeting a specific power to be delivered). An example bulk temperature model integrates estimated changes in temperature according to a simplified temperature generation estimate and a simplified temperature dissipation estimate. In certain embodiments, a conduit temperature model estimates temperature in the conductive portion (e.g., the metal portion of a wire, engaging blades of a connector, etc.) and the non-conductive portion (e.g., the wire insulation, connector body, etc.) separately, providing for a two-stage temperature estimate. In certain embodiments, the temperature calculation may be converted to an equivalent current value, power value, or the like. In certain embodiments, the temperature calculation is utilized to develop an error value for control of a temperature driving control aspect, such as a maximum current, target current, maximum power, target power, maximum or minimum voltage, target voltage, or the like.

In certain embodiments, a model based on ambient temperature, thermal properties of components (e.g., conductivity, specific heat, and/or geometry), electrical throughputs (e.g., voltage, current, power, etc.), and/or measured temperatures (e.g., sensed temperatures for related components, closely associated components, and/or correlated components) provide sufficient model resolution and accuracy for control operations herein. In certain embodiments, higher order effects may be added as needed and in accordance with the characteristics of the system. For example, estimates of convection may be omitted for certain systems (e.g., where limits are likely to be reached in low convection environments based on likely vehicle speed and/or the system arrangement of the component for which the temperature is being estimated). Similarly, and without limitation, radiant heat transfer, thermal property variability as a function of temperature, or other higher order effects may be omitted or included depending upon the system and the goals of the temperature estimation. In certain embodiments, energy transfer to the environment that will not be realize as heat may be included in the model, for example conduction of heat to neighboring components (e.g., a board, coil, connected thermal mass, etc.) and/or a lumped capacitance calculation (e.g., estimating energy storage and/or release into electrical capacitance for the component) may be utilized in a temperature estimate. In certain embodiments, control of current, voltage, power throughput, or the like may additionally include limit operation (e.g., a maximum applied current, regardless of the temperature model output) and/or time-based operations (e.g., allowing for a first maximum current for a period of time, and a second maximum current after the period of time).

In embodiments, the power management controller 118 further includes a power tracking circuit 220 structured to perform a power point tracking operation in response to the at least one temperature value 214; and the load power management circuit 202 is further structured to provide the at least one of the power modulation command 204 or the voltage modulation command 208 in response to the at least one temperature value 214.

Figure 3:
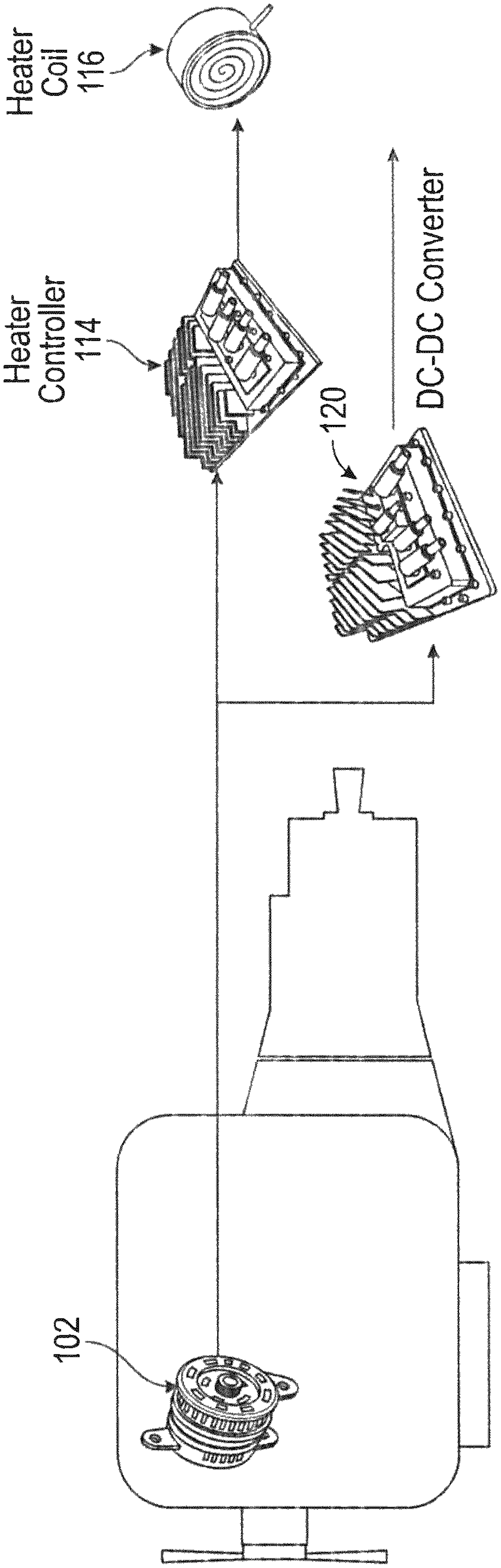
FIG. 3 describes an example aftertreatment heater system.

FIG. 3 describes an example aftertreatment heater system. An example aftertreatment heater system includes a 48V alternator 102 to generate 10 KW at engine idle which may be an enhancement over off-the-shelf, a heater controller 114, and a DC-to-DC converter 120. No energy storage or buffer batteries are needed. The example aftertreatment heater system reduces total system cost. No energy storage is necessary to maintain power quality and enhanced alternator development is not needed.

Figure 4A:
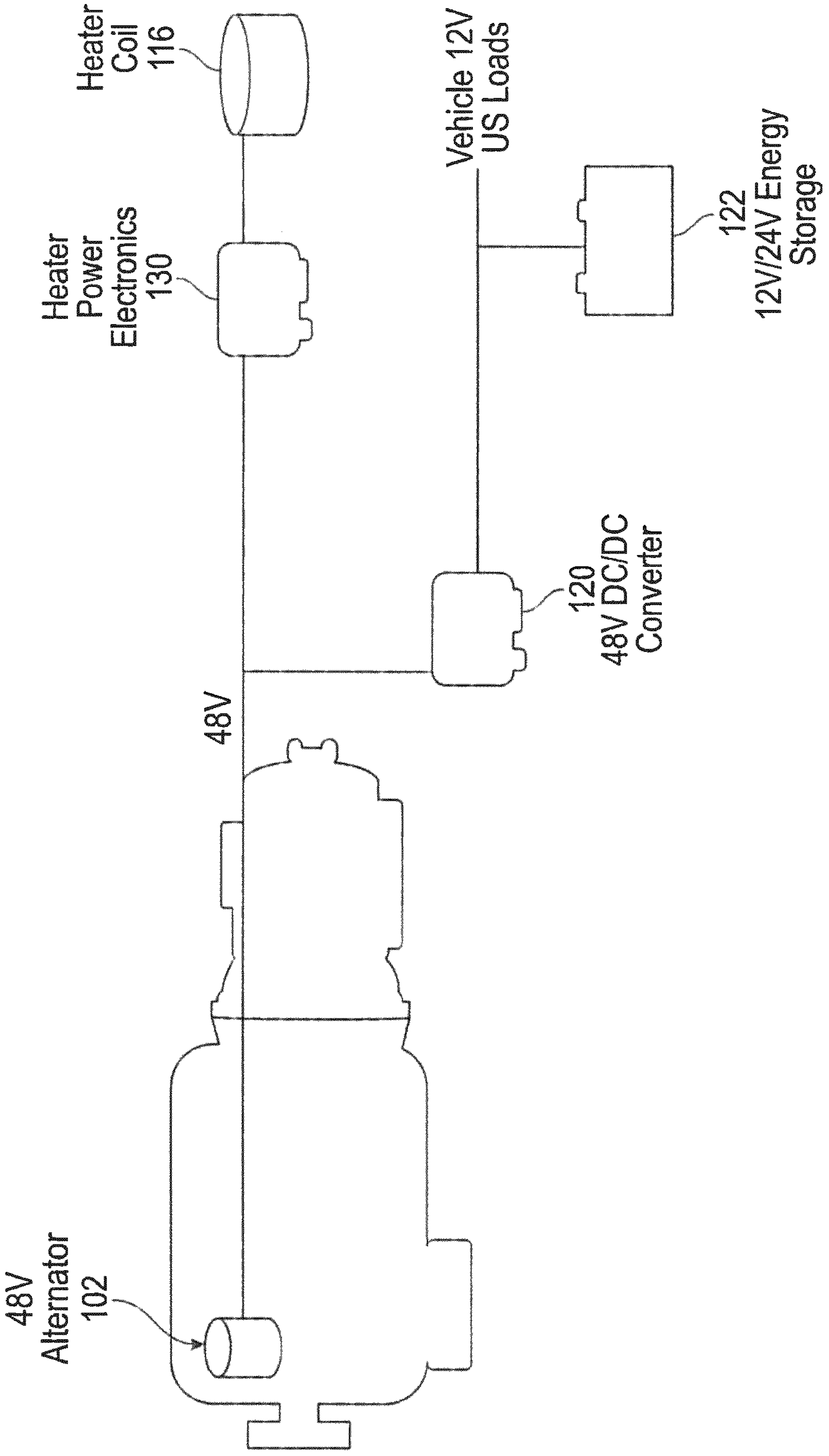
FIG. 4A and FIG. 4B describe 48V for aftertreatment heating and 48V for significant carbon dioxide impact, respectively.
Figure 4B:
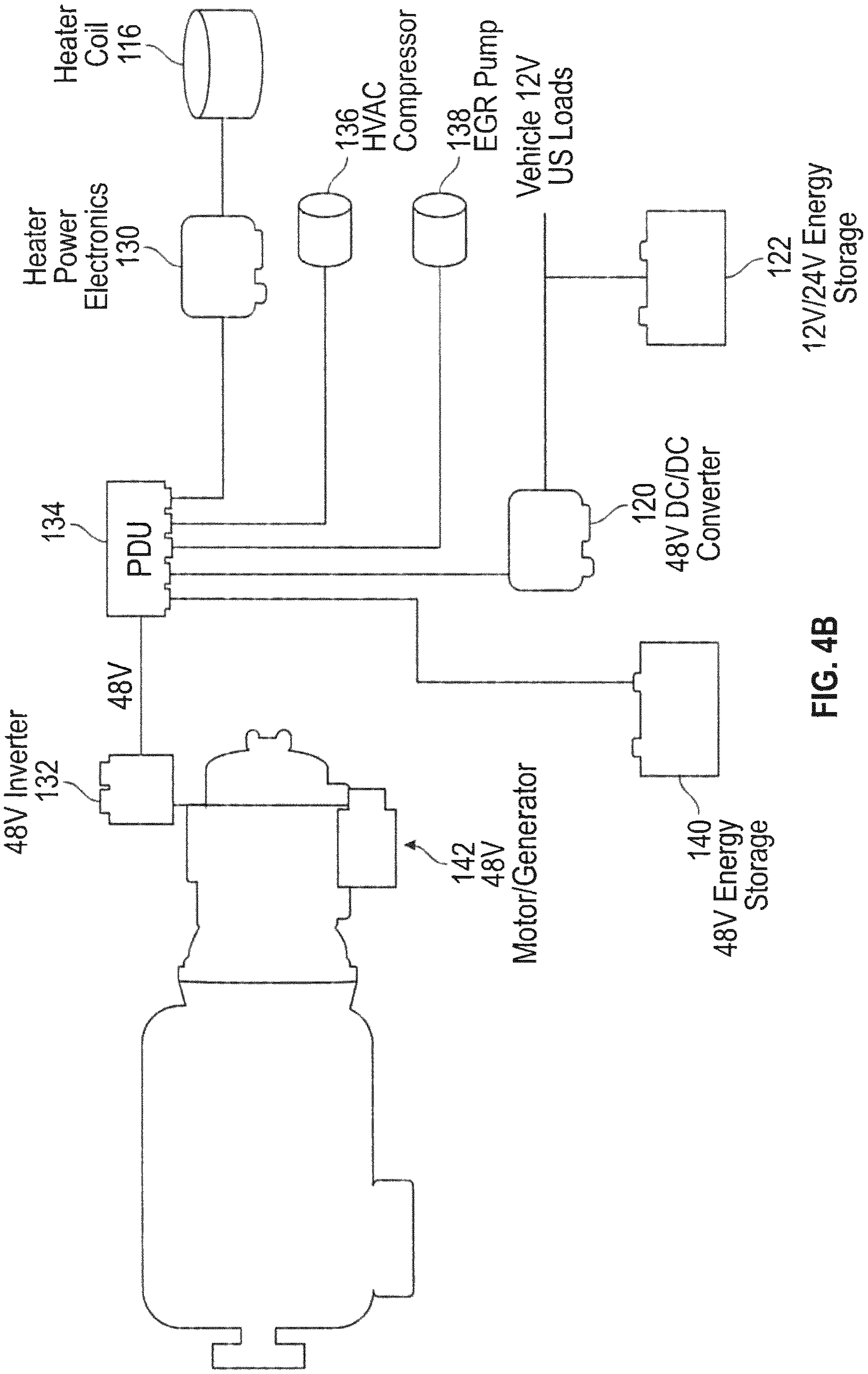

FIG. 4A and FIG. 4B describe 48V for aftertreatment heating and 48V for significant carbon dioxide impact, respectively. FIG. 4A illustrates an example system that includes a 48V alternator 102 connected to a 48V DC to DC converter 120 and heater power electronics 130. The 48V DC to DC converter 120 is connected to a 12V/24V energy storage 122 and provides power to a US vehicle 12V load. Heater power electronics 130 are connected to a heater coil 116. In the illustrated embodiment, 13 kW of power is provided to the load. The illustrated embodiment includes a 48V system and integration providing a minimal approach focused on meeting $NO_x$ regulations. The example system provides base components for a 48V system which can be available for upgraded power at a later time. FIG. 4B illustrates an example system that includes a 48V inverter 132 and a 48V motor/generator 142 that provides 48V to a PDU (power distribution unit) 134. The PDU 134 distributes power to heater power electronics 130 and heater coil 116, an HVAC compressor 136, EGR (exhaust gas recirculation) Pump 138, 48V DC to DC converter 120, and 48V Energy Storage 140. The 48V DC to DC converter 120 is connected to a 12V/24V energy storage 122 and provides power to a 12V load US Vehicle 12V load. The illustrated embodiment includes a 48V system that not only has a significant $CO_2$ impact but includes aftertreatment heating through enhanced electrification. The illustrated system includes mild-hybrid regeneration plus torque assist. As shown, example loads include HVAC, EGR pump, and aftertreatment heater.

Figure 5:
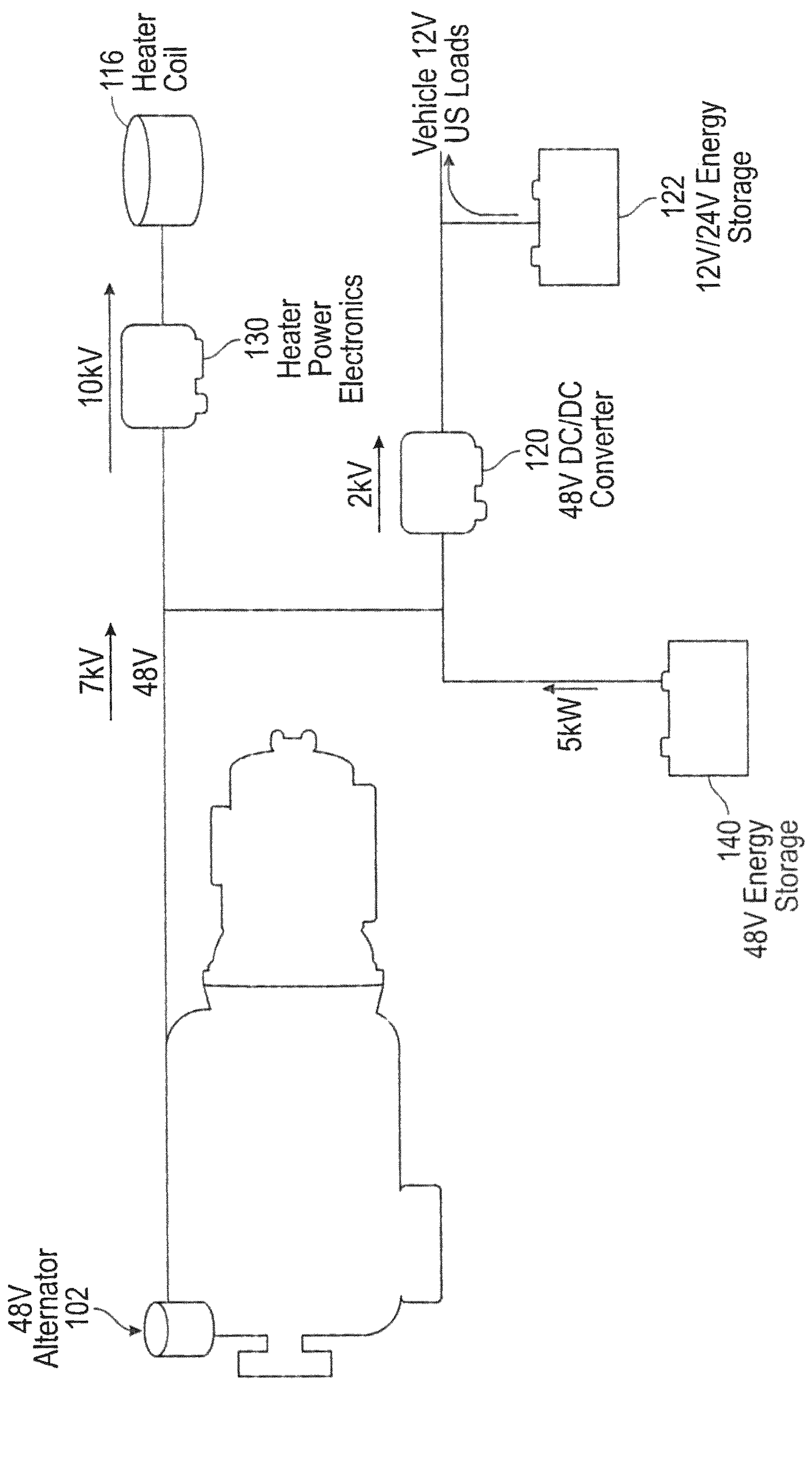
FIG. 5 describes an example 48V power flow.

FIG. 5 describes an example 48V power flow. An example 48V system for significant $CO_2$ impact plus heating is provided. The example system includes a 48V alternator 102 that provides 48 V to heater power electronics 130 and a heater coil 116, and a 48 V DC to DC converter 120. The 48 V DC to DC converter 120 is connected to a 12V/24V energy storage 122 both of which provide power to a US vehicle 12V load. The example system provides 12V crank from 12V battery and meets peak power demand from 48 lead-acid battery (48 V Energy Storage 140). In order to meet peak power demand from 48V lead-acid battery, operation on lower voltage (36V) is utilized, higher-current heater power electronics (6-phase) is driven, and one or more battery packs may be an emissions component. The illustrated example system is an expanded system architecture with a full set of 48V-enabled functions.

Figure 6:
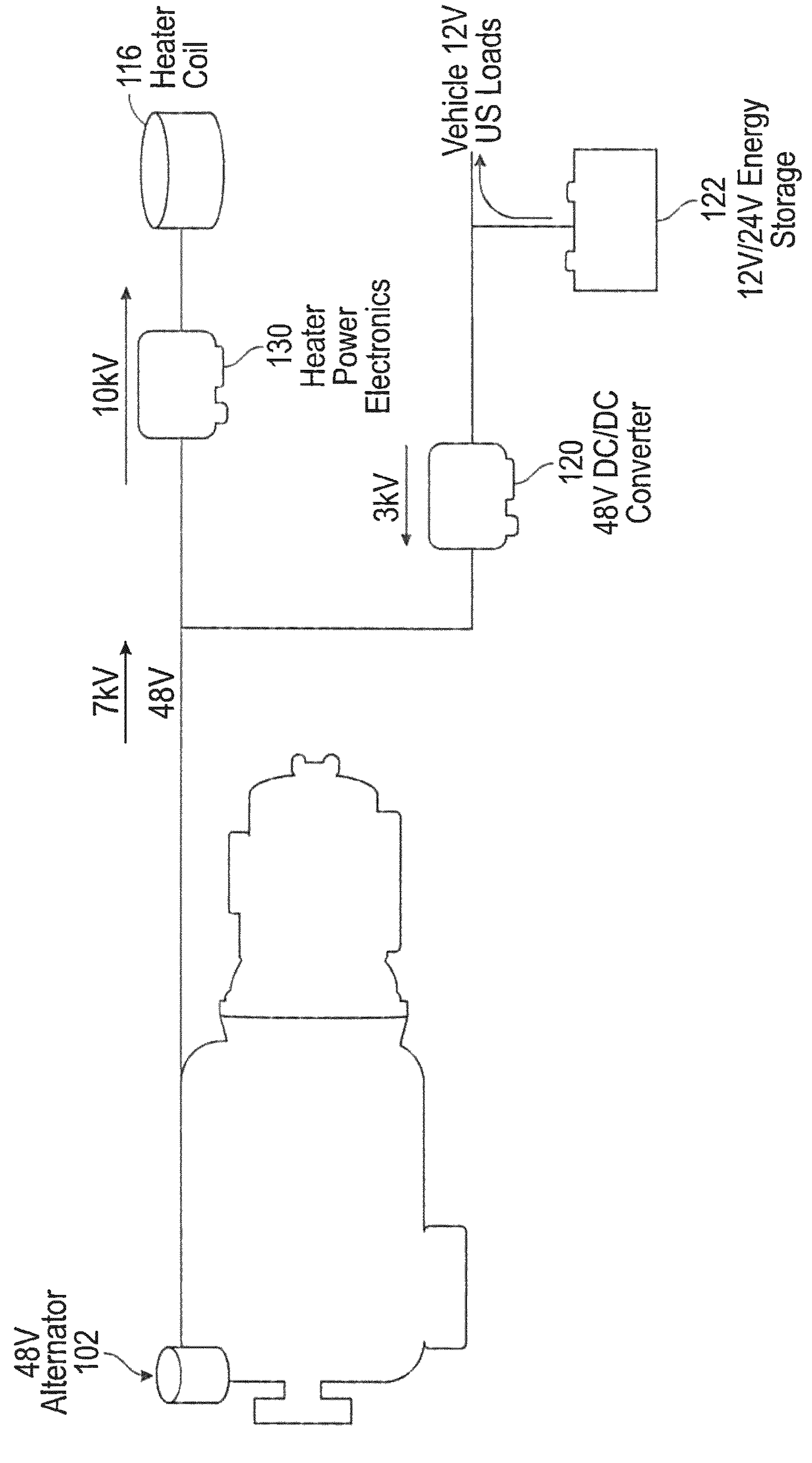
FIG. 6 describes an example 48V power flow.

FIG. 6 describes an example 48V power flow. An example 48V system for significant $CO_2$ impact plus heating is provided. The example system includes a 48V alternator 102 that provides 48 V to heater power electronics 130 and a heater coil 116. The 48 V DC to DC converter 120 is connected to a 12V/24V energy storage 122 both of which provide power to a US vehicle 12V load. The example system provides 12V crank from 12V battery and meets peak power demand from 12/24V battery 122 for warm-up. In order to meet peak power demand from 12/24V battery 122, a separate battery on the 48V bus is eliminated, the DC-to-DC converter 120 is operated in boost mode to fill power demand gap, the 48V bus is maintained at 52 V during warm-up, and the heater power electronics 130 may be 4-phase. The battery may not be an emissions component. In an embodiment, the example system includes 4 start batteries for more margin, and first 5 minutes will be at 12.0-12.5V after cold start. The illustrated example system is an expanded system architecture will a full set of 48V-enabled functions.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A system, comprising:
an electrical load for a vehicle;
a power provider for the electrical load, comprising a plurality of components comprising:
a battery pack;
a vehicle alternator; and
a DC/DC converter electrically interposed between the electrical load and others of the plurality of components of the power provider; and
a power management controller, comprising:
a load power management circuit configured to:
receive and determine a data value of a load power request; and
provide at least one of a power modulation command or a voltage modulation command in response to the load power request,
wherein the DC/DC converter is responsive to the at least one of the power modulation command or the voltage modulation command to provide at least one of a boost voltage or a buck voltage to a voltage provided by at least one of the battery pack or the vehicle alternator.

2. The system of claim 1, wherein:
the power management controller further comprises a power tracking circuit configured to perform a power point tracking operation; and
the load power management circuit is further configured to provide the at least one of the power modulation command or the voltage modulation command in response to the power point tracking operation.

3. The system of claim 2, wherein the power point tracking operation comprises a maximum power point tracking operation.

4. The system of claim 1, wherein:
the power management controller further comprises a temperature determination circuit configured to interpret at least one temperature value of at least one component of the power provider; and
the load power management circuit is further configured to provide the at least one of the power modulation command or the voltage modulation command in response to the at least one temperature value.

5. The system of claim 4, wherein the temperature determination circuit is further configured to interpret the at least one temperature value in response to a temperature model of the at least one component.

6. The system of claim 5, wherein the at least one component comprises at least one of: a conduit coupled to the electrical load, a connector, a battery terminal, a battery, a battery pack, or an alternator.

7. The system of claim 5, wherein:
the power management controller further comprises a power tracking circuit configured to perform a power point tracking operation in response to the at least one temperature value; and
the load power management circuit is further configured to provide the at least one of the power modulation command or the voltage modulation command in response to the at least one temperature value.

8. The system of claim 1, wherein the load power management circuit is further configured to provide the voltage modulation command in response to a voltage drop across one of the plurality of components of the power provider.

9. The system of claim 8, wherein the one of the plurality of components of the power provider comprises a wire electrically coupling the DC/DC converter to the electrical load.

10. The system of claim 1, wherein the load power request comprises at least one of:
a power request to service activity of the electrical load;
when power is transferred from a driveline of the vehicle to at least one of the battery pack or the vehicle alternator, a power transfer request; or
a power requirement.

11. The system of claim 10, wherein the power transfer request comprises requesting an amount of power to be recovered, during a power regeneration operation, from the driveline to at least one of the battery pack or the vehicle alternator.

12. The system of claim 10, wherein the power requirement is 5 kW of load.

13. The system of claim 1, wherein the load power request comprises at least one of:
a state value indicating that power transfer is requested or quantifying the power transfer requested;
a power value, including a power direction indication;
at least one of an electrical characteristic request and a limit for an electrical characteristic;
a transient description for at least one of: the state value, the power value, the electrical characteristic request, or the limit for an electrical characteristic; or
hysteresis for at least one of: the state value, the power value, the electrical characteristic request, or the limit for an electrical characteristic.

14. The system of claim 13, wherein the state value indicates at least one of: heating, heating at a specific mode, initial heating, maintenance heating, aftertreatment regeneration heating, a regenerative braking mode, or a coasting mode.

15. The system of claim 13, wherein the electrical characteristic request comprises at least one of: 150 A and 50V DC; and
wherein the limit for the electrical characteristic comprises at least one of: 2.5 kW to a heater of the vehicle or ≥48V DC.

16. The system of claim 13, wherein the transient description comprises at least one of: a ramp-up rate, a ramp-down rate, or selected filtering on a load power request.

17. The system of claim 13, wherein the hysteresis comprises at least one of: limiting toggling behavior, limiting switching behavior, toggling between power ratings, turning an actuator on or off; or changing power direction.

18. The system of claim 1, wherein the load power request is provided by at last one of an external controller, a vehicle controller, an engine controller, an aftertreatment controller, or a controller associated with the electrical load.

19. The system of claim 1, wherein the load power request is determined from at least one of: a system state; a start event of a prime mover of the vehicle; ambient conditions of the vehicle; an operating mode of the prime mover of the vehicle; or an operating mode of an aftertreatment system of the vehicle.

* * * * *